P. B. KITCHIN.
Gas Generator.
No. 26,070.
Patented Nov. 8, 1859.
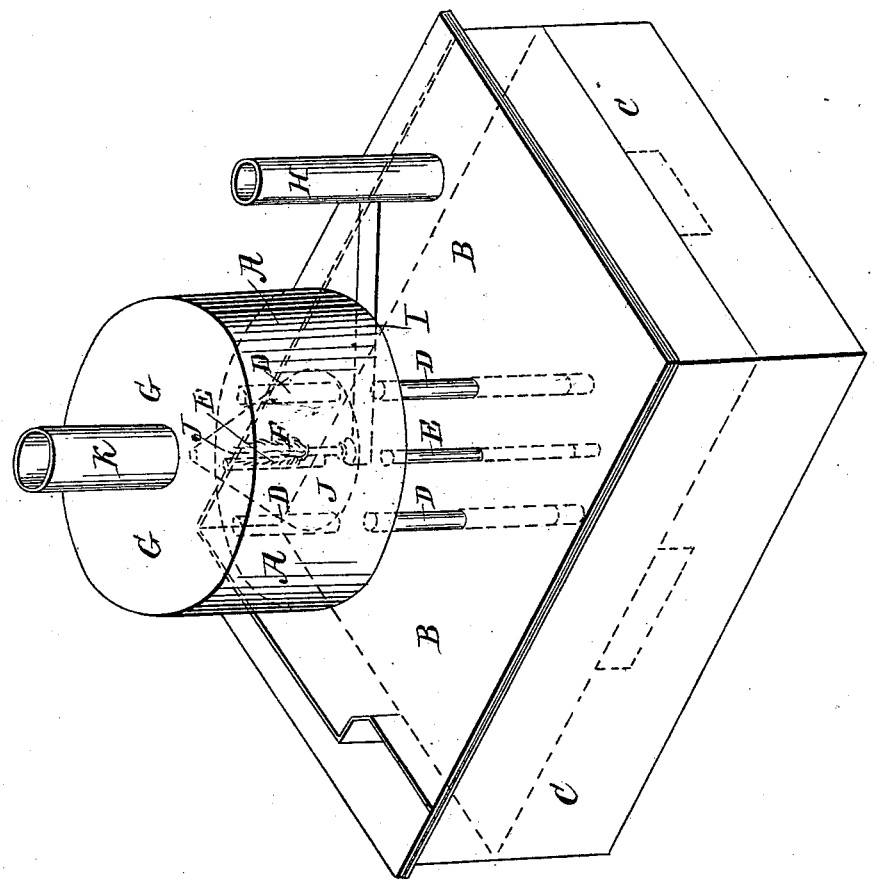
Witnesses
George Grigg
Saml Reiter
Inventor;
Pearson B Kitchin

UNITED STATES PATENT OFFICE.

PEARSON B. KITCHIN, OF PHILADELPHIA, PENNSYLVANIA, ASSIGNOR TO WM. M. MARSHALL, OF SAME PLACE.

APPARATUS FOR HEATING HYDROCARBON LIQUIDS.

Specification of Letters Patent No. 26,070, dated November 8, 1859.

*To all whom it may concern:*

Be it known that I, PEARSON B. KITCHIN, of the city of Philadelphia and State of Pennsylvania, have invented a new and Improved Mode of Generating Gas from Coal-Oils or other Materials; and I do hereby declare that the following is a full and exact description thereof.

The nature of my invention consists in the use of an air chamber made of any suitable material placed in connection with any air chamber or bellows and a generating tank, said air chamber to have a conical or other shaped bottom with the application of a heating flame to heat the air when necessary before coming in contact with the chemicals, and said air chamber to have one or more pipes passing from it into the generator to be partially submerged in the liquid thoroughly producing evolution, and a perfect commingling of the gases and the atmospheric air, and also producing a steady and uniform light.

The main or principal features of my invention are the production of ebullition by immersing the air tubes, and heating the air in the air chamber before passing it into the generator. By the first I overcome the difficulty arising from a film spreading over the chemicals by reason of a surface pressure. At the same time the gentle undulations are not liable to produce vapor in excess as in other modes of agitating chemicals; and in the second I prevent the destruction of the active properties of the chemicals by not heating the chemicals, but by heating the air before coming in contact therewith, and I also overcome the great difficulty arising from condensation. The submersion also steadies the light which has heretofore been difficult to attain, the depth of submersion to be regulated by a common float and valve as used in various water gages, and to be supplied by a feeder.

In the drawing A represents the hot air chamber. B, the top of the gas generator. C an inner box air chamber inside of the generator. D, tubes passing downward into the chemicals, being made air tight at the points where they pass through the upper chamber. E smaller tubes, and only passing down into the upper chamber. F the flame escaping from a gas burner where it affords heat to warm the air in chamber A, by being applied to and beneath the conical bottom J. K the air tube leading from the machine, and which is forced into it by bellows. M gas tube. J small gas tube leading to the burner F.

What I claim as my invention and desire to secure by Letters Patent is,

The application to gas generators of a hot-air chamber as previously described and the submerging of one or more air pipes therefrom into or upon the chemicals for the purposes set forth and herein described or any other substantially the same and which will produce the intended effects.

PEARSON B. KITCHIN.

Witnesses:
GEORGE GRIGG,
SAML. REITER.